United States Patent [19]
Hawthorne et al.

[11] Patent Number: 5,917,935
[45] Date of Patent: Jun. 29, 1999

[54] MURA DETECTION APPARATUS AND METHOD

[75] Inventors: Jeffrey A. Hawthorne, San Francisco; Joseph Setzer, Pleasanton, both of Calif.

[73] Assignee: Photon Dynamics, Inc., San Jose, Calif.

[21] Appl. No.: 08/651,417

[22] Filed: May 22, 1996

Related U.S. Application Data

[60] Provisional application No. 60/000,181, Jun. 13, 1995.

[51] Int. Cl.$^6$ .................................................. G06K 9/00
[52] U.S. Cl. .......................... 382/149; 382/141; 382/203; 348/126
[58] Field of Search ..................................... 382/141, 143, 382/149, 145, 176, 203, 260, 279, 266; 348/125, 126; 345/189, 191, 904

[56] References Cited

U.S. PATENT DOCUMENTS

| | | | |
|---|---|---|---|
| 4,286,293 | 8/1981 | Jablonowski | 358/101 |
| 4,519,041 | 5/1985 | Frant et al. | 364/468 |
| 4,771,468 | 9/1988 | Batchelder et al. | 382/8 |
| 5,012,524 | 4/1991 | Le Beau | 382/8 |
| 5,058,178 | 10/1991 | Ray | 358/106 |
| 5,204,911 | 4/1993 | Schwartz et al. | 382/8 |
| 5,311,598 | 5/1994 | Bose et al. | 382/1 |
| 5,339,093 | 8/1994 | Kumagai et al. | 340/784 |
| 5,544,256 | 8/1996 | Brecher et al. | 382/149 |
| 5,640,199 | 6/1997 | Garakani et al. | 348/87 |

*Primary Examiner*—Christopher S Kelley
*Assistant Examiner*—Sheela Chawan
*Attorney, Agent, or Firm*—Townsend and Townsend and Crew LLP

[57] ABSTRACT

A method and apparatus for identifying and classifying pixel defects, and in particular Mura defects using digital processing techniques. The present method includes steps of acquiring an image with a Mura defect, and performing a Laplacian convolution on the image to enhance the Mura defect against background illumination. A step of thresholding the Mura defect against the background illumination is also provided. The thresholded Mura defect is compared against the original Mura defect to define statistical parameters of the original Mura defect. An annular region is defined around the periphery of the Mura defect. Statistics of the annular region defines statistics for background illumination as compared to the original Mura defect. The statistics from the Mura defect are then compared to the background illumination statistics for Mura defect classification and analysis.

45 Claims, 9 Drawing Sheets

MURA DETECTION APPARATUS AND METHOD

CROSS REFERENCE TO RELATED APPLICATIONS

This application claims priority to Provisional Application Serial No. 60/000,181 filed Jun. 13, 1995, and incorporates it by reference for all purposes.

BACKGROUND OF THE INVENTION

The present invention relates to methods and apparatus for automatic test inspection. Merely by way of example, the invention is illustrated as an automatic inspection method and apparatus for classification of defects, more specifically for detection of "Mura"-type defects in substrates. Substrates include liquid crystal flat panel displays, active matrix displays and the like.

The uses of a liquid crystal flat panel displays (LCFPD) or the like continue to grow rapidly. Consumer items such as portable video recorders, pocket televisions, notebook computers, engineering work-stations, high-definition televisions (HDTV), and the like incorporate such displays. Based upon the continued demand for such displays, the industry have made massive capital investments to create state-of-art manufacturing lines.

Despite such capital outlay, however, the industry still rely primarily upon human test operators to perform the final test and inspection of such substrates. The test operator performs a variety of visual inspections of each display for defects and accepts or rejects the display based upon the operator's perceptions. The quality and completeness of the inspection is dependent on the individual test operator, who has been trained using limited samples of displays that are characterized as passing or failing. Accordingly, the inspection results are highly subjective, prone to error, and cannot be used consistently and efficiently to monitor, control, and improve the quality of the various manufacturing processes. In addition, the subjective testing criteria results in a lack of industry wide quality standards.

Effective process monitoring and control of LCFPD production cycle is possible only through quantitative and qualitative inspection methods by way of automatic inspection machines. An example of one of the first automatic inspection apparatus was conceived by Photon Dynamics, Inc. (PDI) in 1992, assignee of the present application. FIG. 1 shows the role of an automatic inspection apparatus during the final testing stages of the LCFPD manufacturing processes 10. The LCFPD undergoes completion, step 12, first inspection via flat panel inspection apparatus, step 14, module assembly, step 16, second inspection via flat panel inspection apparatus, step 18, shipment, step 20, and incoming inspection via flat panel inspection apparatus, step 22. A communication network 24 provides an interface between each of the inspections at the flat panel inspection system and a process control work-station 26.

Major classes of LCFPD defects encountered at the final inspection are often pixel defects or wide-area pixel defects (also known as Mura defects). Problems in the manufacturing process of the LCFPD often cause Mura defects. Because certain manufacturing problems cause certain types of Mura defects, thus identification and elimination of the manufacturing problems often leads to the reduction of Mura defects during subsequent processing runs. However, it is often difficult to recognize the Mura defects by category and relate such defect to a step in the manufacture process. In particular, the Mura defects are often too difficult for the test operator to identify easily, and to categorize efficiently and cost effectively. Accordingly, no easy way of identifying defect types and categorizing such defects for analysis presently exists.

From the above, it is seen that methods and apparatus for the efficient identification, and classification of defects such as Mura defects and the like are often desirable.

SUMMARY OF THE INVENTION

According to the invention, a method and apparatus for detecting and classifying a defect such as a Mura defect and the like of a substrate are provided. The present method includes a sequence of steps which enhance Mura defects for the purposes of defect analysis.

According to one embodiment, a method for detecting Mura defects on a substrate for a flat panel display, the substrate including a first plurality of pixels includes the steps of acquiring an image of at least a portion of the substrate, the portion including a second plurality of pixels, the image including values of pixels in the second plurality of pixels, and enhancing differences in the values of pixels in the second plurality of pixels to form an enhanced image, the enhanced image including enhanced values of pixels in the second plurality of pixels. The steps of thresholding the enhanced values of pixels in the second plurality of pixels to form a thresholded image, the thresholded image including thresholded values of pixels in the second plurality of pixels, and identifying a third plurality of pixels forming at least one blob within the portion of the substrate in response to the thresholded image are also included. The method also includes comparing values of the third plurality of pixels to values of pixels corresponding to an annular region around the at least one blob, and determining a Mura defect in response to the comparison step.

According to another embodiment, a computer system for detecting Mura defects on a substrate for a flat panel display, the substrate including a first plurality of pixels, comprises an image acquisition device for acquiring an image of at least a portion of the substrate, the portion including a second plurality of pixels, the image including values of pixels in the second plurality of pixels, and an enhancer for enhancing differences in the values of pixels in the second plurality of pixels to form an enhanced image, the enhanced image including enhanced values of pixels in the second plurality of pixels. A thresholder for thresholding the enhanced values of pixels in the second plurality of pixels to form a thresholded image, the thresholded image including thresholded values of pixels in the second plurality of pixels, and an identifier for identifying a third plurality of pixels forming at least one blob within the portion of the substrate in response to the thresholded image are also provided. The computer system also comprises a comparator for comparing values of the third plurality of pixels to values of pixels corresponding to an annular region around the at least one blob, and a determiner coupled to the comparator for determining a mura defect.

According to yet another embodiment, a method for detecting Mura defects in a substrate for a liquid crystal display, the substrate having a plurality of pixels, includes the steps of acquiring an image of the substrate, and creating a plurality of subsampled images from the image. The method also includes the steps of determining locations of potentially defective pixels in the substrate in response to locations of pixels in each of the plurality of subsampled images having anomalous values, and determining Mura defects in the substrate in response to the locations of potentially defective pixels determined in the substrate.

According to yet another embodiment, a computer system including a computer program for detecting Mura defects in a substrate for a liquid crystal display, the substrate having a plurality of pixels, comprises a computer-readable memory including code that directs an image acquisition device to acquire an image of the substrate, and code that creates a plurality of subsampled images from the image. The computer-readable memory also includes code that determines locations of potentially defective pixels in the substrate in response to locations of pixels in each of the plurality of subsampled images having anomalous values, and code that determines Mura defects in the substrate in response to the locations of potentially defective pixels determined in the substrate.

The invention will be better understood by reference to the following detailed description in connection with accompanying drawings.

DESCRIPTION OF SPECIFIC EMBODIMENTS

Glossary

The following terms are intended to have the following general meanings as described herein.

Mura Defects: Examples and Definitions

Mura defects are defined as areas of illumination (pixels on the substrate) which are different, or anomalous, from the neighborhood surrounding the defect, also termed Patterned Brightness Non-Uniformity (BNU). The BNU is generally measured by an image acquisition device position normal to the LCFPD and the BNU is generally of very low contrast. Regions of a substrate often include pixels that appear either brighter or darker than pixels surrounding the region, and are classified as Mura defects when specific contrast threshold limits, BNUs, are reached or exceeded. It is important to note that the boundaries for Mura defects are not always well defined and further, within a Mura defect, the BNU may not be homogenous. Pixel defects, in contrast, are defined as points of illumination that exceed or are lower than the neighboring pixels of the respective pixels. Pixel defects may include individual pixels, clustered pixels, or line segments of pixels that are obvious when visually inspected.

Figure 1:
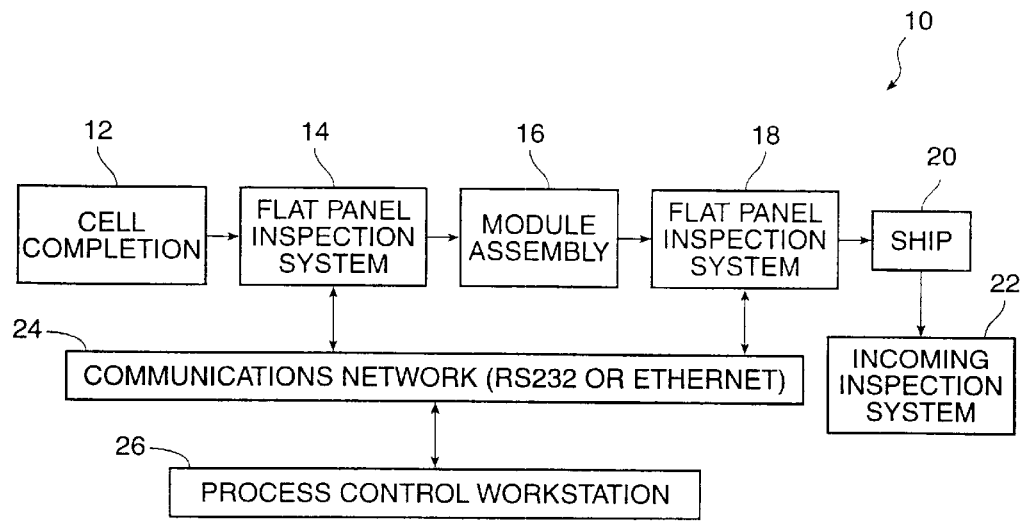
FIG. 1 is simplified block diagram of uses for a conventional automatic inspection machine.
Figure 2:
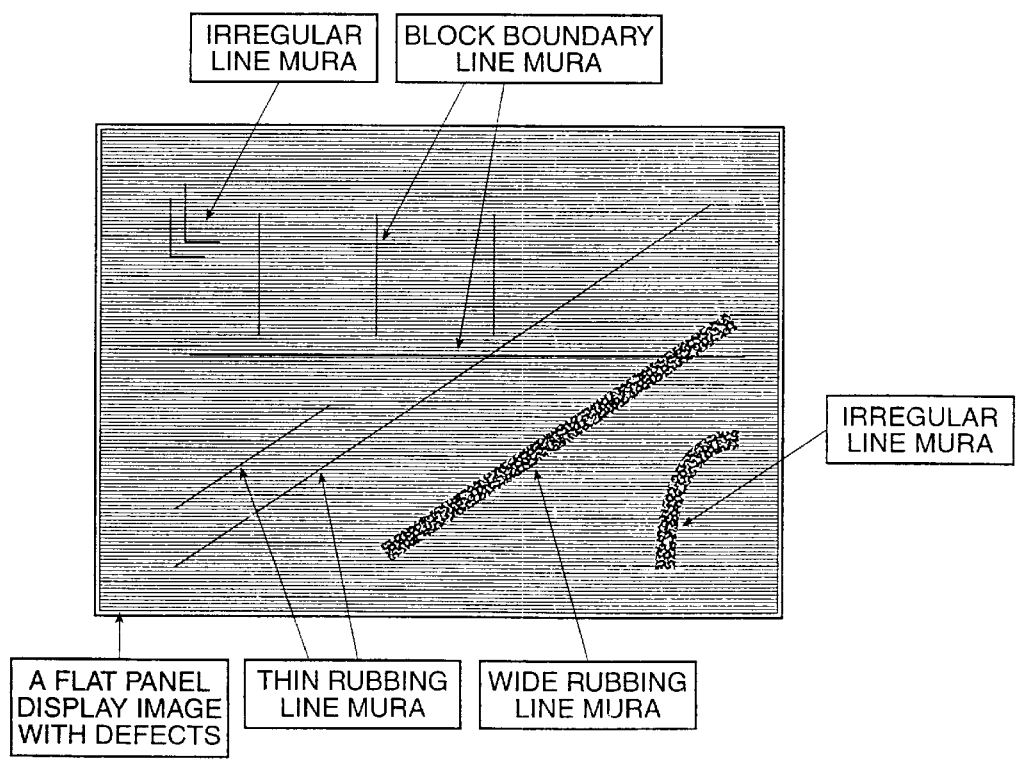
FIG. 2 illustrates examples of line Mura defects in a conventional flat panel display.
Figure 3:
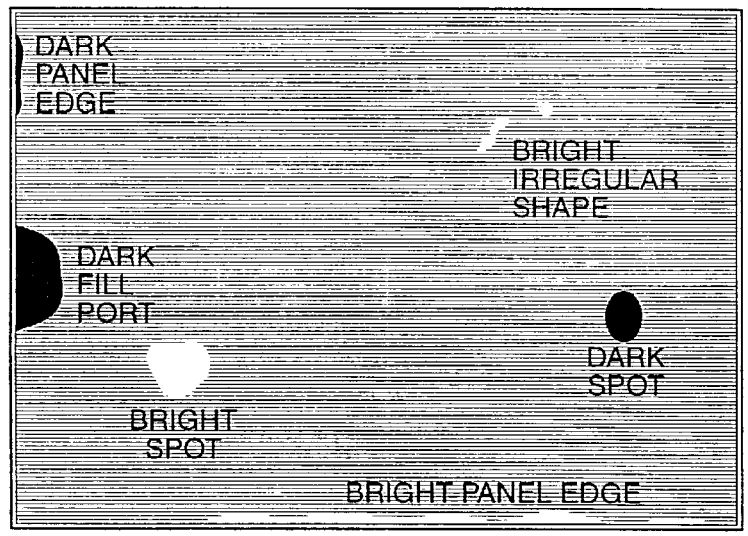
FIG. 3 illustrates examples of area Mura defects in a conventional flat panel display.

The present invention is illustrated by way of example with two types of Mura classes, line Mura defects and area Mura defects, as illustrated by FIGS. 2 and 3, respectfully.

Line Mura Defects

FIG. 2 illustrates typical line Mura defects. A line Mura defect is defined as a narrow straight or curved strip of illumination which is different from its neighborhood. In other words, pixels making-up a line Mura defect have anomalous pixels values, compared to values of pixels surrounding the line Mura defect. The defect may originate and terminate anywhere within the substrate and can run across the entire length of the substrate. The line Mura defect is classified by the length and width of the strip and the angle of occurrence. Typically, such defects have a length-to-width ration exceeding twenty. There are several types of line Mura defects that are classified according to their shape, size, and position, below. Typical manufacturing processes that cause these defects are also listed.

a) Rubbing Line Mura i) Thin short or long line segments at rubbing angles anywhere within the panel ii) Wide short or long line segments as above Note: The two rubbing line Mura types may occur either singly or in groups and are related to the alignment layer rubbing process due to imperfections in the surface of the mechanical rollers used in the rubbing process.

b) Irregular Line Mura

Arcs and L-shaped line segments that appear anywhere within the panel area

Note: The irregular line Mura is often caused by particle or fiber contamination trapped between the polarizer and the glass, by cleaning process residue or by alignment layer rubbing process.

c) Block Boundary Line Mura

Thin long lines that run the length of driver blocks of the panel, horizontal or vertical, perpendicular to the panel edges Note: The block boundary line Mura is often caused by imperfect seamless joints of the device blocks.

Area Mura Defects

FIG. 3 illustrates typical area Mura defects. An area Mura defect is defined as groups of illumination (pixels on the substrate) which are different from their neighborhood. In other words, pixels making-up an area Mura defect have anomalous pixel values, compared to values of pixels surrounding the area Mura defect. The area Mura defect range in size from approximately six pixels in diameter for spot shaped Mura to approximately 25% of the panel display area. There are several types of area Mura defects that are classified according to their shape, size, and position, below. Typical manufacturing processes that cause these defects are also listed.

a) Spot Mura
  i) Elliptical shaped spot, ellipticity ratio can vary from a circle to almost a line Note: The elliptical shaped spot Mura is often caused by cell gap variation or clustering of spacer balls.
  ii) Cluster type spot, circular in shape.
  Note: The cluster type spot Mura is often caused by electro-static charge built-up on spacer balls.
b) Fill Port Mura
  i) Elliptical shape positioned at the fill port
  ii) Multiple lines that arch away from the fill port
  Note: Both types of fill port Mura are often caused by contamination of the liquid crystal material.
c) Panel Edge Mura
  i) Located around the entire perimeter of the panel active area.
  Note: The panel edge Mura is often caused by polarizer variations or local bleeding of uncured epoxy board material.
d) Irregular shape Mura
  i) Wavy arched shape ranges from small thick shape to more regular L shape
  Note: The irregular shape Mura is often caused by fiber contamination trapped between the polarizer and the glass cleaning process residue or alignment layer rubbing process.

The aforementioned definitions of defects such as the line Mura and the area Mura will be used in the following embodiments according to the present invention.

System Overview

Figure 4A:
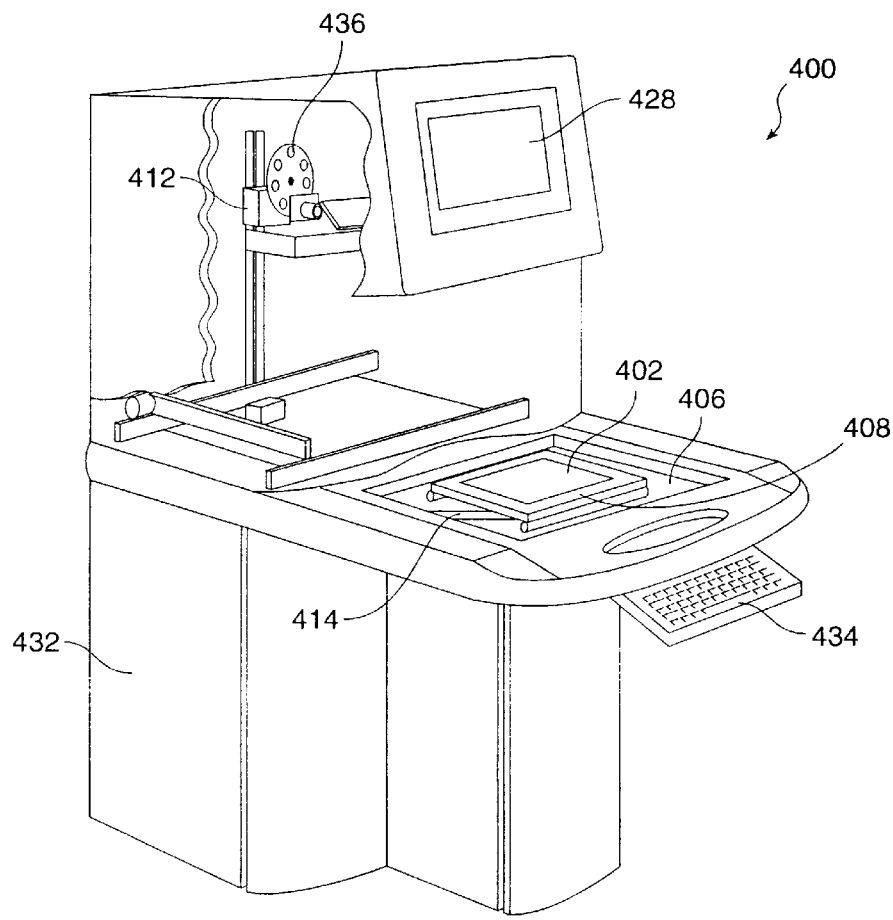
FIG. 4A is a simplified illustration of an embodiment of an inspection apparatus according to the present invention.

FIG. 4A is a simplified illustration of an embodiment of an inspection apparatus 400 according to the present invention. The present invention is preferably embodied as a FIS-250 or FIS-300 machine available from Photon Dynamics, Inc. The inspection apparatus includes a flat panel display, such as an LCD panel 402 and the like. The LCD panel 404 positions on the slidable table 406, and a hinged frame 408, which is brought down to secure the display panel in place. The slidable table 406 allows for easy positioning of the LCD panel in an x-y plane under a camera 412 such as a CCD-type camera and the like. The slidable table also allows for the LCD panel to be shifted relative to the camera. Alternatively, the camera is mounted onto an x-y plane to shift the camera relative to the LCD panel. A flexible ribbon type wire 414 supplies drive signals from the pixel drive circuitry in the test system to conductors on the hinged frame 408. The camera 412 is preferably a high resolution camera, and is encased with an upper body 426 of the inspection apparatus. A monitor 428, a computer 432, and a keyboard 434 are also shown. The inspection apparatus includes a plurality of color filters 436, among other features. An example of such an inspection apparatus is in U.S. application Ser. No. 08/394,668 (Attorney Docket No. 14116-35-2), which is hereby incorporated by reference for all purposes.

The flat panel display (FPD) includes regularly patterned light emitting areas surrounded by light blocking borders. The light emitting areas are electrically addressed and are often referred to as pixels. The pixels are spaced equally from each other with opaque borders to form a two dimensional periodic pattern.

The CCD camera may have a construction similar to the flat panel display. Each of the pixels in the camera responds to light by converting an electrical signal (with a voltage) which is proportional to the amount of light that strikes the camera pixel. The camera pixel includes a border that does not respond to light. Each of the pixels are spaced equally from each other, and also form a two dimensional periodic pattern. The pattern of pixels forms discrete sampling points of light intensity that define the image impinging on the CCD camera.

Camera pixels discrete sampling of the image of the FPD pixels creates an interference pattern commonly known in the trade as Moire interference. The interference pattern is a periodic modulation of the image voltage signal created by the CCD camera. The period of modulation is a function of the period of the pattern of the CCD pixels and the flat panel pixels. The periodic modulation of the image often impedes the ability of an inspection system to detect and characterize real defects that may be present on the flat panel display. The real defects also modulate the signal but tend not be periodic in nature. Accordingly, methods for reducing or even eliminating the periodic modulation are often used to ensure accurate detection of real defects. The aforementioned application Ser. No. 08/394,668 illustrates selected techniques to reduce and even eliminate the periodic modulation.

Figure 4B:
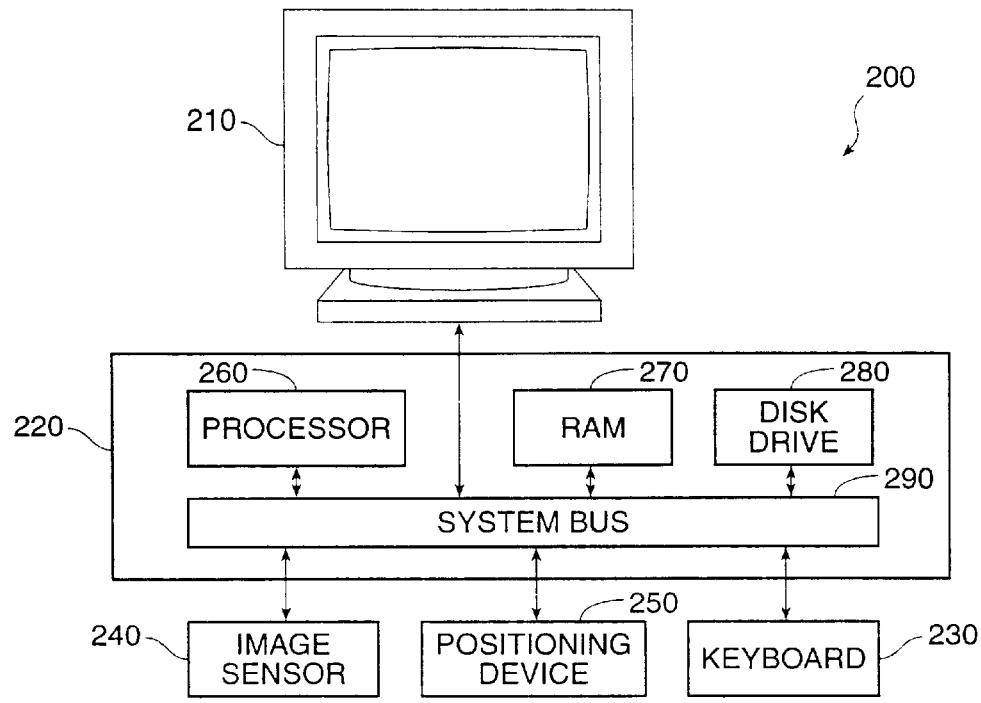
FIG. 4B is a block diagram of a system according to an embodiment of the present invention.

FIG. 4B is a block diagram of a system 200 according to an embodiment of the present invention. System 200 includes a monitor 210, a computer 220, a keyboard 230, a mouse, an image sensor 240, and a positioning device 250. Computer 220 includes familiar computer components such as a processor 260, and memory storage devices, such as a random access memory (RAM) 270, a disk drive 280, and a system bus 290 interconnecting the above components. A network interface device (not shown) can be coupled to system bus 290 to provide system 200 with network access.

A mouse is but one example of a graphical input device, also known as a pointing device, a digitizing tablet is another. RAM 270 and disk drive 280 are examples of tangible media for storage of computer programs, other types of tangible media include floppy disks, removable hard disks, network servers, optical storage media such as CD-ROMS and bar codes, semiconductor memories such as flash memories, read-only-memories (ROMS), ASICs, and battery-backed volatile memories, and the like. The system bus may be a PCI bus, VME bus, or the like.

Positioning device 250 enables the user to position image sensor 240 relative to a substrate, as was previously described. An x-y stepper station is but one example of a well known positioning device.

In a preferred embodiment, System 200 includes a Sun SparcStation™5, running Solaris™4.1 operating system from Sun Microsystems, Inc. and proprietary hardware and software available from Photon Dynamics, Incorporated.

FIG. 4B is representative of but one type of system for embodying the present invention. It will be readily apparent to one of ordinary skill in the art that many system types and configurations are suitable for use in conjunction with the present invention.

Mura Classifications

In a specific embodiment, the present invention provides for methods and apparatus for identification and classification of Mura defects from a substrate. It is preferred that identification and classification techniques are based upon the contrast of pixels having "anomalous" values to pixels in a background. The contrast is termed the brightness non-uniformity value BNU.

A relative brightness non-uniformity for pixels is rated from about 1 to about 5, where 5 represents a higher contrast and 1 represents the lowest contrast. A specific embodiment correlates each BNU value with a difference in percentage of gray scale. (As is well known, the gray scale represents the total number of brightness levels available for example, between an inactive pixel and a completely active pixel.) An example of the correlation is shown by Table 1.

TABLE 1

Correlation of BNU and % GRAY SCALE

| BNU | % GRAY SCALE |
| --- | --- |
| 1 | 0.7 |
| 2 | 3.5 |
| 3 | 6.4 |
| 4 | 9.0 |
| 5 | 12.0 |

Alternatively, the BNU values may correlate to the gray scale by way of a different correlation. The BNU values may also range from 1 to 10, or 1 to 20, or another. As the range of BNU values increases, the correlation between the BNU value and the gray scale increases or decreases accordingly. Preferably, the BNU value is a linear relationship with respect to the % of gray scale. Of course, the exact BNU values used and their relationship to the gray scale percentage depends upon the particular application.

The present identification techniques allow for enhanced identification of defects in substrates in a efficient manner. Based upon this identification, the determination of the manufacturing process step that caused the defect is enhanced. Subsequently, the manufacturing step can be modified to inhibit such defects in future production runs. The present invention provides classification of Mura defects based in part, to attributes of the defect. Paragraphs A–E below, describe examples of types of Mura defects and their specific attributes. The specific attributes include Mura defect orientation (paragraph a.), defect location (paragraph b.), defect width (paragraph c.), defect length (paragraph d.), BNU value (paragraph e.), and others.

A. Line Mura Patterns
1. Center line defects: A type of defect often caused by circuit patterning misalignment where an excessive gap exists in a center line panel.
   a. Horizontal orientation
   b. Centered in vertical direction of panel
   c. Width-approximately 50 microns
   d. Length varies
   e. BNU: 3.0–4.5
2. Alignment layer material: Film thickness non-uniformities can cause horizontal and vertical (less common) lines.
   a. Orientation horizontal or vertical or angled
   b. Position varies
   c. Wide with poorly defined edges
   d. Length varies
   e. BNU: 1.5–3.0
3. Alignment layer rubbing defects: Defects are often caused by particle contamination between the rubbing roller and the plate.
   a. Angled orientation (angle would be known by the user)
   b. Position varies
   c. 1–3 mm wide
   d. Length varies
   e. BNU: 2.0–3.0
4. Alignment layer cleaning defects: Defects are usually multiple short wavy lines caused by residue of alignment layer cleaning process.
   a. Angled orientation (generally follows the alignment layer angle)
   b. Position varies, however clustering may be an important feature
   c. 1–3 mm wide
   d. Short length (5–10 mm)
   e. BNU: 1.5–3.0
5. Fiber contamination defects: Fiber contamination is usually trapped between the polarizer and the glass.
   a. No specific orientation
   b. Position varies
   c. (50–500) microns wide
   d. Generally arched shaped
   e. BNU: 1.5–2.5

B. Spot Mura Patterns
1. Elliptical shaped spot: The elliptical shaped spot is often caused by cell gap variation or clustering of spacer balls.
   a. Elliptical shape where ellipticity ratio varies from circle to almost a line
   b. Varied position on panel
   c. Major diameter: 3–50 mm
   d. Length defined by diameter
   e. BNU: 2.0–3.5 for cell gap
      3.0–5.0 for spacer ball cluster
2. Cluster type spot Mura: Cluster type spot Mura is often caused by electro-static charge build-up on spacer balls. The result is a high density of circular brightness non-uniformities.
   a. Circular shape
   b. Covers up to 25% of panel with a high density
   c. Diameter: 1–3 mm
   d. Length defined by diameter
   e. BNU: 1.0–2.5 (high density of circular brightness non-uniformities).

C. Fill Port Mura
1. Line type brightness non-uniformity: Line type brightness non-uniformity Muras are multiple lines that arch away from the fill port, caused by contamination of the liquid crystal material.
   a. Arched shaped lines
   b. Positioned at the fill port
   c. Line width: 1–5 mm
   d. Length: 25 mm
   e. BNU: 2.0–3.0
2. Spot type: A spot type fill port Mura is an elliptical shaped brightness non-uniformity positioned at the fill port.
   a. Elliptical shape
   b. Positioned at the fill port
   c. Major diameter: 5–15 mm
   d. Length defined by diameter
   e. BNU: 3.0–4.5
3. Arched area: An arched area defects are solid arched areas on both sides of the fill port.
   a. Area type BNU with an arched shape
   b. Positioned at the fill port
   c. Approximately 25% of the panel area
   d. Length defined by occupied panel area e. BNU: 2.0–3.0

D. Panel Edge Mura

1. A panel edge Mura is a brightness non-uniformity Mura located around the entire perimeter of the panel active area, typically caused by polarizer variations.
   a. Band shaped width
   b. Positioned around entire active area perimeter
   c. Width about 5–15 mm
   d. Length defined by perimeter
   e. BNU: 3.5–4.0

E. Block Mura

1. A block Mura is a large rectangular area brightness non-uniformity, caused by a faulty row or column driver. The BNU can be either solid (often caused by a complete driver failure) or "noisy" (often caused by poor connection between panel lines and the driver).
   a. Rectangular shaped
   b. Positioned within one of the panel drive segments or blocks (typically there are 8 blocks for a STN-LCD VGA resolution panel)
   c. Width defined by a segment
   d. Length defined by a segment
   e. BNU: Solid: 4.5–5.0
      "Noisy": 3.5–4.5

The aforementioned description of specific attributes of Mura defects may be used by the present invention to identify and characterize the Mura defects. The present invention also includes a preferred detection method to use such specific attributes as described by way of the following specific embodiments.

Mura Defect Detection

Figure 5:
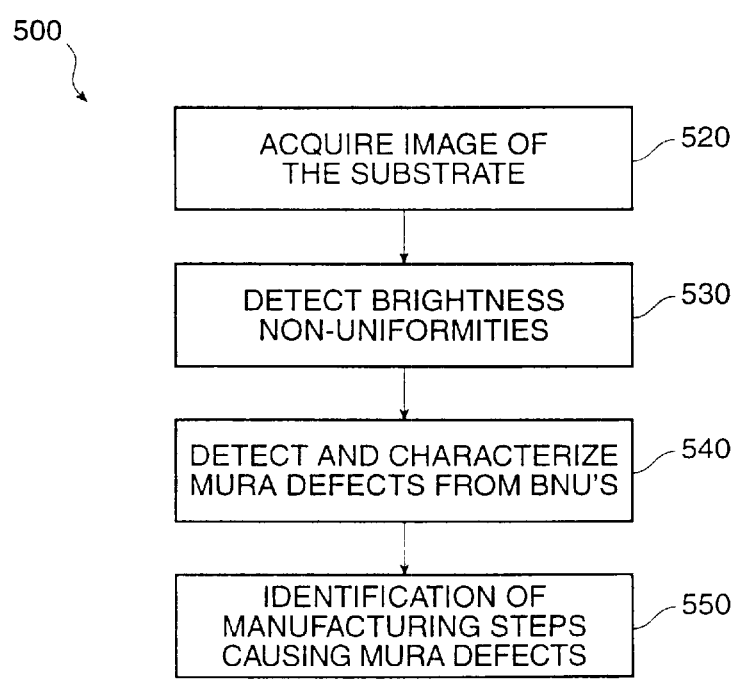
FIG. 5 is a simplified flow diagram of a Mura detection method according to the present invention.

FIG. 5 is a simplified flow diagram 500 of a Mura detection method according to the present invention. Flow diagram 500 includes steps 520–550.

Initially an image (frame of data) of a substrate is acquired by an image acquisition device or retrieved from computer memory, step 520. Typical image acquisition devices include CCD cameras, line scan camera, frame store cameras, and the like. Examples of preferred image acquisition techniques may be found in application Ser. No. 08/394,668 (Attorney Docket No. 14116-35-2), which is hereby incorporated by reference for all purposes, and assigned to the present assignee. Alternatively, an image of the substrate previously acquired may be retrieved from computer memory.

After image acquisition, the present invention provides methods for detection of pixels in the image of the substrate having brightness non-uniformities, step 530.

Next, a step of the analysis for characterization of the Mura defect is then performed, step 540. Based upon the Mura defect, identification of particular steps in the manufacturing process, which cause the Mura detects is enhanced, step 550.

Figure 6:
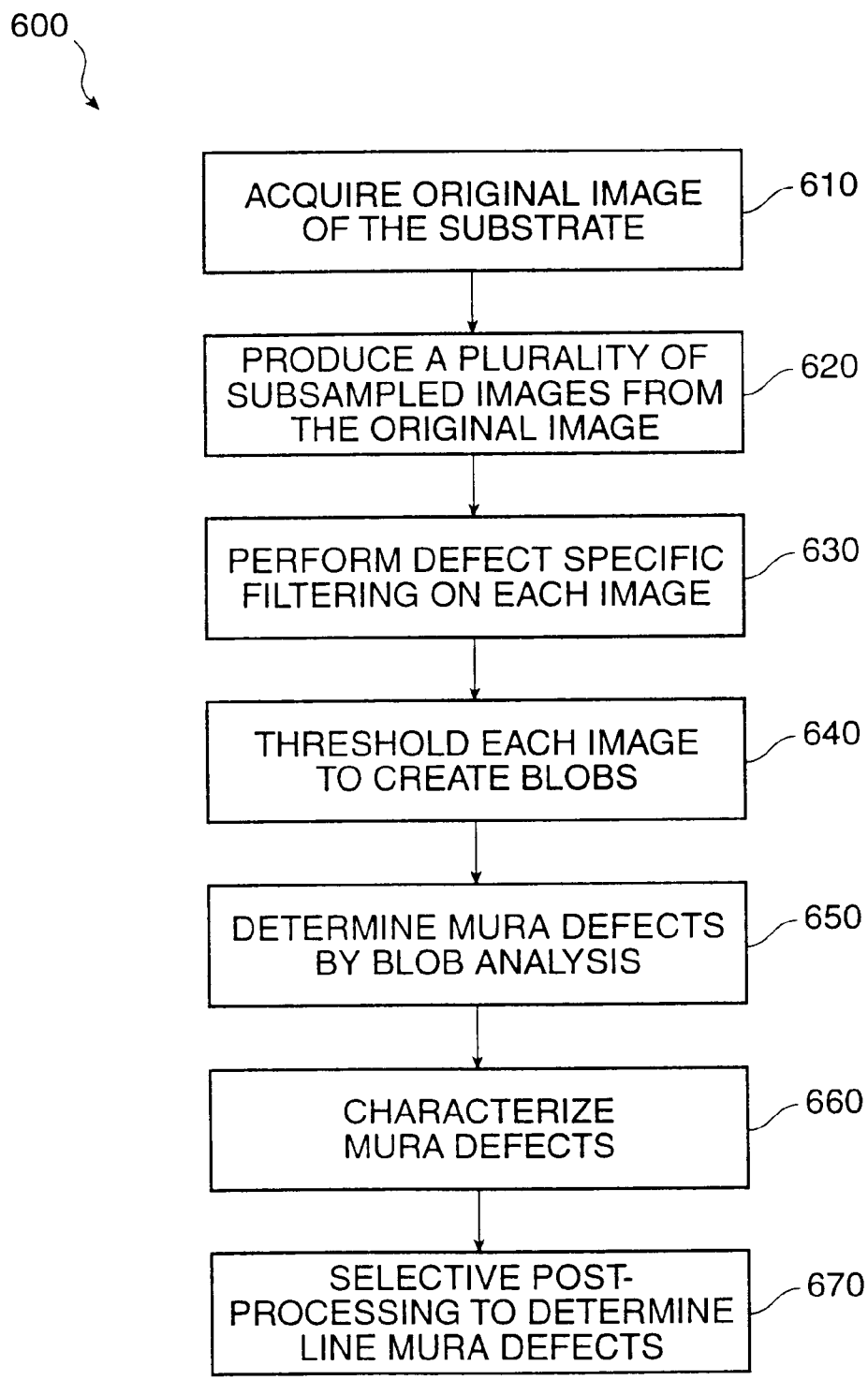
FIG. 6 illustrates a simplified flow diagram of a method for detecting line Mura according to a preferred embodiment.
Figure 6A:
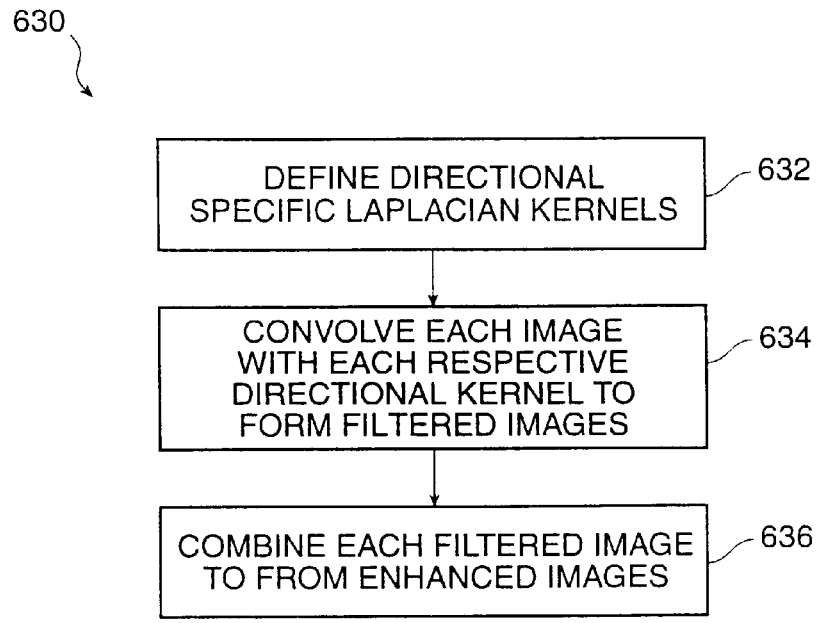
FIG. 6A illustrates a flow diagram for a preferred embodiment for the step of performing defect specific filtering by the image processor.
Figure 6B:
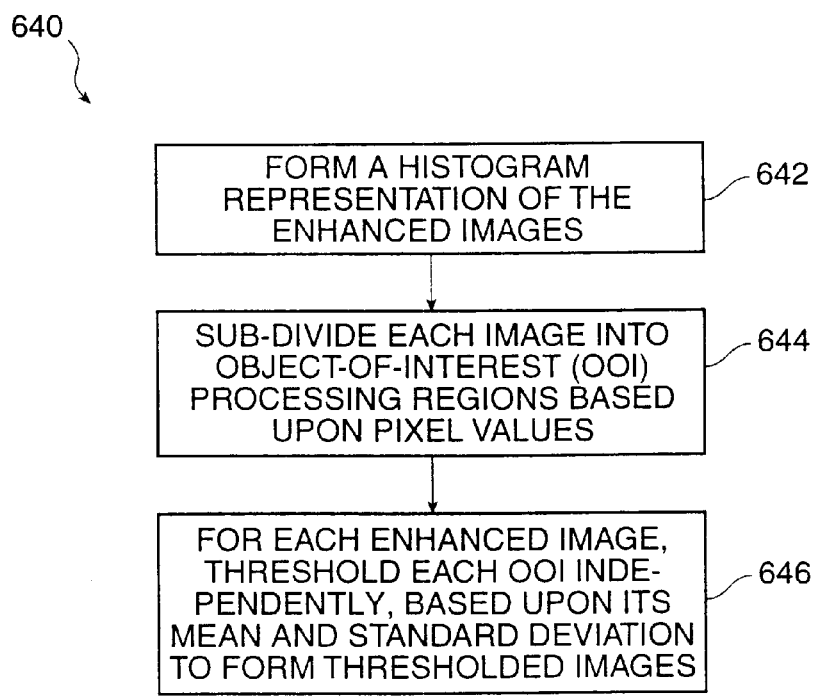
FIG. 6B illustrates a flow diagram for a preferred embodiment for the step of thresholding each of the images to create blob(s)
Figure 6C:
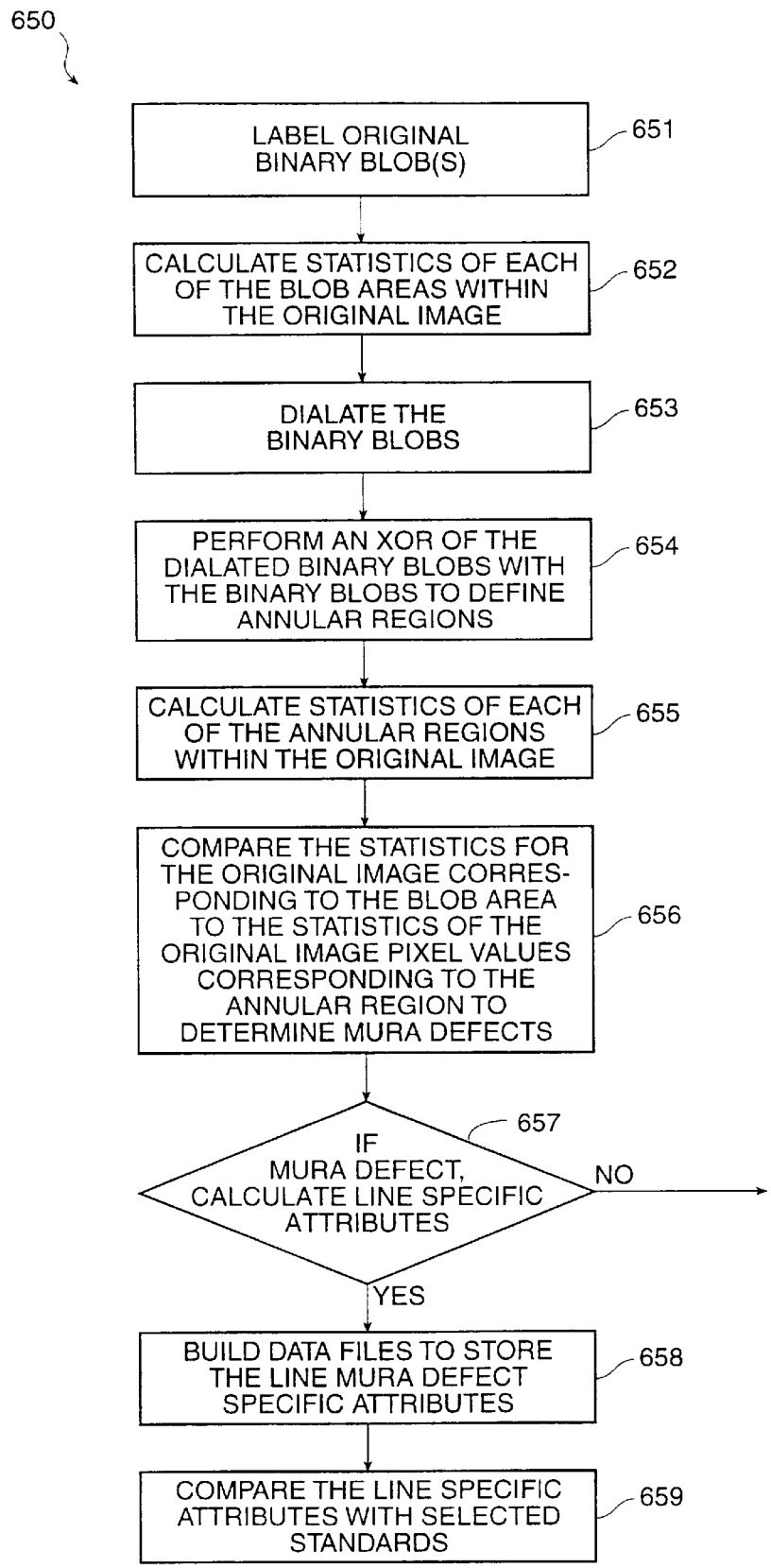
FIG. 6C illustrates a more detailed flow diagram for the step of creating and analyzing blobs from the thresholded images.
Figure 6D:
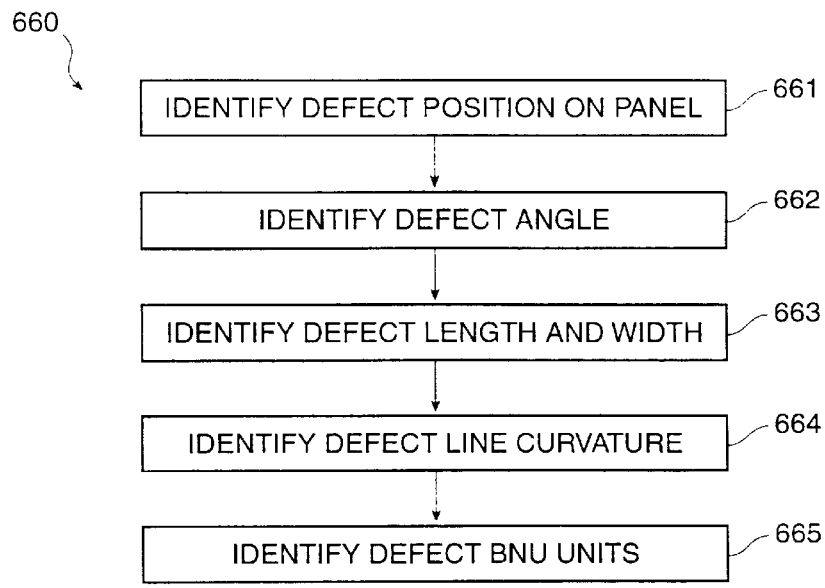
FIG. 6D illustrates a preferred embodiment of a flow diagram for step defect analysis.
Figure 7:
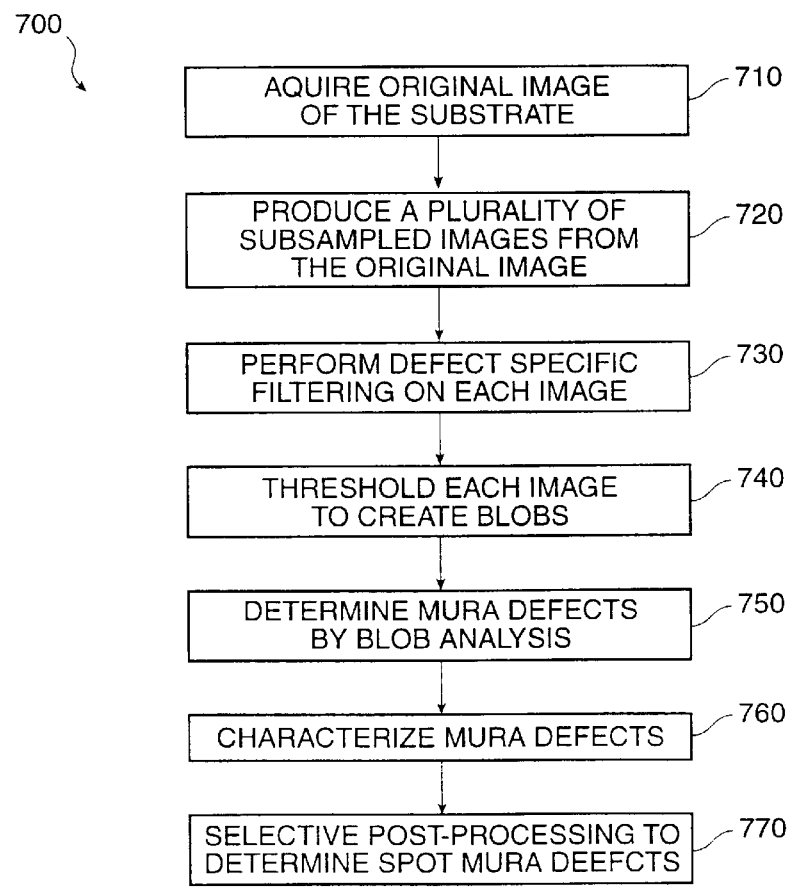
FIG. 7 is a simplified flow diagram of a spot Mura detection method according to the present invention.

Details of the line Mura detection method are illustrated in FIGS. 6 to 6D, and a spot Mura detection method is illustrated in FIG. 7.

Line Mura Defects

FIG. 6 illustrates a simplified flow diagram 600 of a method for detecting line Mura according to a preferred embodiment. Flow diagram 600 includes steps 610–670.

An outline of embodiments of the present method for Mura detection is as follows.

I. Line Mura Detection Method:

A. Image Acquisition

1. Acquire raw original image(s) from a flat panel display (FPD) using any combination of the methods described in this document B. Produce Sub-sampled Images 1. Perform a two-dimension linear interpolation for sub-sampling of raw images Note: The sampling frequency is dependent on the defect size. For line defects, the determining factor is often the line width C. Perform Defect Specific Filtering 1. Define directional Laplacian kernels each oriented every 15 degrees from about 0 to about 165 degrees from a horizontal axis 2. Perform a convolution of each image with each of the respective directional kernels.

3. Combine each convolved image to form a results image by way of the combination rule Note: The combination rule preserves a maximum value at each convolved image location and provides a completely enhanced image.

D. Image Thresholding to create Blobs

1. Form a histogram representation of the results image from image pixel values

2. Sub-divide the image pixel values into object-of-interest (OOI) processing regions based on overall image statistics Note: Each OOI processing region covers a substantially unique range of image pixel values.

3. Threshold of each OOI independently based on its mean and standard deviation

Note: Each OOI is now a binary representation relative to its background after thresholding.

4. Define original binary blobs from the thresholded OOI processing regions

E. Blob Analysis

1. Label original binary blob(s) (typically by way of scanning the display from left to right, and then top to bottom, and combinations thereof)

2. Calculate statistics of the blob area within the original image by using the original labelled binary blob as a process mask 3. Dilate the original binary blobs 4. Perform an XOR of the dilated binary blobs with the original binary blobs to define annular regions 5. Calculate statistics of the annular region within the original image by using the annular region as a process mask 6. Compare the statistics for the blob within the original image to the statistics of the annular region within the original image to determine Mura defects 7. If a Mura defect is determined, calculate line specific attributes such as a elongation, a length, an angle, and end point coordinates of the Mura defect 8. Build a data file to store the line specific attributes 9. Compare the line specific attributes of the Mura defect with selected standards F. Defect Analysis (refer to aforementioned characterization of Mura defects)

1. Identify defect position on panel

2. Identify orientation, shape, and angles

3. Identify defect width and length

4. Identify defect curvature
5. Identify defect BNU units
G. Selective Post-Processing
1. Eliminate false detection of pixel type line defects by line Mura detection method
2. Eliminate duplicate detection of the same defect found at two or more spatial sub-sampling rates By reference to FIGS. 6A to 6D, and the aforementioned outline, a detailed description of the method is provided.

A first step in line Mura detection includes acquiring an image of the substrate or retrieving the image from memory, step 610. Preferably, the image(s) are acquired (or captured) by one or more of selected image acquisition devices and techniques known in the art. Of course, the particular technique used depends upon the application. The present invention also does not limit the type of image acquisition technique to this image acquisition technique or others.

After image acquisition, an image processor produces a plurality of subsampled images, step 620. The subsampled images may be directly subsampled from the original image or be subsampled from a previous subsampled image.

The selection of the number and ratio for sub-sampling the original image is based upon defect spatial frequency considerations. For example, if a two-dimension image is sub-sampled four square-pixels to one new pixel, effectively the spatial frequency of the new sub-sampled image is one half the original frequency. The sub-sampling frequency is generally dependent on the size of the defect or the width of a defect line the user wishes to detect.

The processing steps below, each operate upon the individual sub-sampled images. For example, steps 630–670 operate upon the original image, then operate upon a first sub-sampled image, then operate upon a second sub-sampled image, etc. In the step of selective post processing, step 670, data from each of the images operated upon are combined, as will be discussed.

FIG. 6A illustrates a flow diagram for a preferred embodiment for the step of performing defect specific filtering by the image processor. FIG. 6A includes steps 632–636.

As is well known to one skilled in the art frequency filtering of an image can be performed in the time domain by convolving the image with convolution kernels, or alternatively in the frequency domain by multiplying the fourier transform of the image with an image of a filter. In the present embodiment, convolutions in the time domain are preferred.

In one embodiment, the step of performing defect specific filtering begins by defining directional-specific Laplacian kernels, step 632. In one embodiment, the Laplacian kernels are directionally oriented beginning at about 0 degrees and increment approximately every 15 degrees to about 165 degrees. In this case twelve kernels are defined. A 0 degree and approximately a 75 degree 4×4 Laplacian kernel are illustrated below.

| -1 | -1 | -1 | -1 |
| 1 | 1 | 1 | 1 |
| 1 | 1 | 1 | 1 |
| -1 | -1 | -1 | -1 |
| -1 | 1 | 1 | -1 |
| -1 | 1 | 1 | -1 |
| 1 | 1 | -1 | -1 |
| 1 | 1 | -1 | -1 |

In alternative embodiments, other kernel sizes and increment degrees are envisioned. The smallest angle increment often depends upon the processing capabilities and kernel size of the particular system. Of course, smaller angle increments such as single degree increments are envisioned as technology progresses.

Next, each image is individually convolved with each of the respective directional kernels, step 636, thus forming a plurality of filtered images. Because each of the Laplacian filters above are directional, each filtered image enhances edges (differences in values of adjacent pixels) oriented in that specific direction within the original image. In the example above, twelve such filtered images are produced.

Next, the filtered images are combined to produce an enhanced image, step 636, by way of the combination rule. This sequence of steps highlights the edges (differences in intensity values) of features in each image.

In an alternative embodiment of step 630, a well known Sobel operator is used to enhance and highlight the edges of features in the images.

FIG. 6B illustrates a flow diagram for a preferred embodiment for the step of thresholding each of the images to create blob(s). FIG. 6B includes steps 642–646.

In one embodiment of the present invention, image thresholding begins with the step of forming a histogram representative of the enhanced images, step 642, typically after step 630. As is well known, a histogram represents the brightness of pixels in an image, typically in the form of a gray scale versus number of pixels. The histogram often defines an x-axis representing brightness, and a y-axis representing the number of pixels.

Next, each image is sub-divided into object-of-interest (OOI) areas, step 644. Each OOI typically includes areas of the image including clusters of pixels having anomalous intensities. Each OOI processing region often represents particular image features such as line Mura defects, spot mura defects, background illuminations, and others. A substantially unique range of pixel values in the histogram preferably identifies each OOI.

After OOIs have been determined, each OOI in the image is binarized, based upon a pixel threshold, step 646, to form thresholded images. The pixel threshold is preferably determined by the mean and standard deviation of each respective OOI.

In an alternative embodiment of the present invention, a threshold value for each enhanced image is determined in response to the mean and standard deviation for the entire, respective enhanced image. Typically the threshold is set to be from two to three times the standard deviation away from the mean of the image.

Threshold values can be set differently to locate pixels that are brighter than other pixels on the image, and to locate pixels that are darker than other pixels on the image.

FIG. 6C illustrates a more detailed flow diagram for the step of creating and analyzing blobs from the thresholded images. FIG. 6C includes steps 651–659.

In one embodiment of the present invention, blobs are determined and labeled from each threshold image, step 651. Blobs are represented as binary representations of the OOI processing region relative to background values. For example, a blob may be defined as a completely black image against white background illumination. Alternatively, the blob may be represented by a completely white image against a black background illumination. Blobs are determined typically from each OOI processing region.

The labelling step 651 assigns a label(s) (typically in numerical form) to each of the binary blob(s). The label is preferably a unique label such as a number, a letter, or any other character in increasing order or the like. An image processor often scans the blob images from left-to-right, and from top-to-bottom, and the like, or any combinations thereof to identify and label each of the binary blob(s). The labelling step identifies (or earmarks) and stores each blob for further analysis. In some embodiments, the labelling step may not be necessary but is preferable.

Next, the embodiment provides for calculating physical statistics about each blob detected, step 652. A labelled binary blob acts as a process mask (because of similar size, shape, but of constant gray level) to measure selected statistics of the portion of the original image corresponding to the blob area. As a reference point, selected statistics such as range, mean, and standard deviation for the original image within the blob area are easily obtained by calculations. The selected statistics define the actual characteristics for the blob within the original image.

Figure 8A:
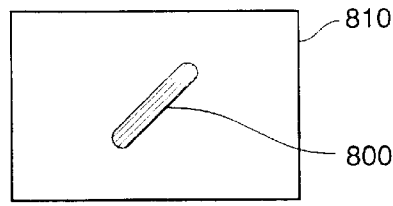
FIGS. 8A–8C illustrate the process of defining an annular region.
Figure 8B:
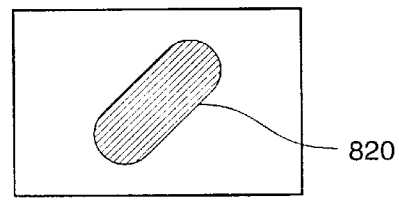
Figure 8C:
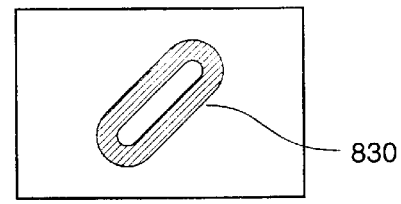

In the next steps, the blobs are dilated, step 653 and an "annular" region around each blob is determined, step 654. This region is typically along the perimeter of the blob. In a preferred embodiment, an XOR (Exclusive OR) operation of the dilated labelled binary blob with the labelled binary blob defines the annular region. Other techniques may also be used to define the annular region surrounding the periphery of the labelled binary blob, such as a "Top Hat" or closing algorithm. Of course, the particular technique often depends upon the application. FIGS. 8A–8C illustrate the process of defining an annular region.

As illustrated in FIG. 8A after the above steps, blob 800 in threshold image 810 is identified, as illustrated in FIG. 8A. Next, using known morphological techniques, blob 800 is dilated to form blob 820, as illustrated in FIG. 8b. The dilation step uses a spatial convolution of the labelled binary blob image. In a preferred embodiment of the present invention a spatial convolution may be carried out by use the following convolution kernel, with a subsequent threshold level of one.

| 1 | 1 | 1 |
| 1 | 1 | 1 |
| 1 | 1 | 1 |

The convolution kernel above dilates the labelled binary blob by one pixel, or two pixels, or more around its periphery. In FIG. 8c, blob 800 and 820 are then Exclusive-ORed (XOR) to form annular region 830.

In the next step, pixels in the original image corresponding to where an annular region of a blob has been found (from step 654) are determined, step 655. Statistics for these pixels, such as mean and standard deviation are then calculated. The annular region is considered representative of a selected background region of the blob from the original image.

Next in FIG. 6C, statistics for the blob area within the original image are compared to the annular area within the original image, step 656. The statistics determine whether a Mura defect is present. More specifically, the comparing step identifies a Mura defect by way of brightness nonuniformity (BNU) and obtains a percentage difference. The mean value may be supplemented by a standard deviation. If the comparison falls under user selected criteria, no Mura defect is returned, step 657.

Other parameters used to calculate line specific attributes such as orientation, position, width, length, BNU, end point coordinates, and others are calculated in step 657. These parameters are subsequently stored in a data file or the like, step 658. Based upon previously stored data, the line specific attributes may later be used to identify the particular type of line Mura defect and potential sources (or causes) thereto, step 659.

FIG. 6D illustrates a preferred embodiment of a flow diagram for step 600 defect analysis. FIG. 6D includes steps 661–665.

In one embodiment of the present invention, defect analysis for line Mura defects includes identification of a defect position on the panel 661, a defect angle 662, a defect length and width 663, a line Mura curvature 664, a BNU 665, and the like.

The detection of the defect position on the panel identifies whether a line Mura is positioned along a driver block boundary, or positioned in a center of the panel. The detection of the defect angle identifies line Mura angle or orientation as 0 degree, 90 degrees, or an angle which coincides with a rubbing angle of the panel. A defect line Mura width is also detected to identify potential defect sources. A narrow line Mura is often a candidate for an alignment layer rubbing particle defect. A wide line Mura is often a candidate for an alignment layer rubbing roller/ pressure non-uniformity. A line curvature, a line length, or any other line dimension for each defect line Mura is detected. Lines with high curvature are often attributable to fiber contamination. Other attributes of the defect line Mura were disclosed by the Line Mura Pattern section, above.

After the aforementioned steps, the image processor performs selective post-processing operations, step 670. The selective post-processing operations include steps to eliminate false detection of pixel line defects by the line Mura detection steps, steps to eliminate duplicate detection of the same Mura defect found at two or more sub-sampling rates, and to remove individual pixels defects. Of course, other post-processing operations may be performed, and the present invention is not limited to the described post-processing operations. Further details regarding post processing will be discussed in conjunction with the spot Mura section below.

Spot Mura Defects

FIG. 7 illustrates a simplified flow diagram 700 of a method for detecting spot Mura according to a preferred embodiment. Flow diagram 700 includes steps 710–770.

Briefly, the detection for line Mura defects generally includes steps of image acquisition, step 710, sub-sampling the image, step 720, performing defect specific filtering, step 730, image thresholding to create blobs, step 740, blob analysis, step 750, defect analysis 760, selective post processing 770, and others. Of course, the steps themselves and their sequence may be altered according to the particular application.

The present method for spot Mura detection may also be briefly outlined as follows.

I. Spot Mura Detection Method
  A. Image Acquisition
    1. Acquire original image(s) from a flat panel display (FPD) using any combination of the methods described in this document
  B. Produce Sub-sampled Images
    1. Perform a two-dimension linear interpolation for sub-sampling of raw images
      Note: The sampling frequency is dependent on the defect size. For spot type defects, the determining factor is often spot width.
  C. Perform Defect Specific Filtering
    1. Perform an omni-directional Laplacian convolution kernel
      Note: Kernel size is adjusted as a function of defect size.

D. Blob Analysis
1. Label original binary blob(s) (typically by way of scanning the display from left to right, and then top to bottom, and combinations thereof)
2. Calculate statistics of the blob area within the original image by using the original labelled binary blob as a process mask
3. Dilate the original binary blobs
4. Perform an XOR of the dilated binary blobs with the original binary blobs to define annular regions
5. Calculate statistics of the annular region within the original image by using the annular region as a process mask
6. Compare the statistics for the blob within the original image to the statistics of the annular region within the original image to determine Mura defects
7. If a Mura defect, calculate line specific attributes such as a elongation, a length, an angle, and end point coordinates of the Mura defect
8. Build a data file to store the line specific attributes
9. Compare the line specific attributes of the Mura defect with selected standards E. Defect Analysis
1. Identify defect position on panel
2. Identify orientation, shape, and angles
3. Identify defect width
4. Identify defect length
5. Identify defect BNU units
6. Identify defect color F. Post Processing
1. Remove pixel defects
2. Remove line Mura defects
3. Eliminate duplicate detection of the same defect found at two or more spatial subsampling rates.

By reference to FIG. 7 and the aforementioned outline, a detailed description of each step is provided.

A first step for spot Mura detection method includes a step of image acquisition, step 710. This step is typically performed according to the description in conjunction with step 610.

After image acquisition, an image processor produces a plurality of sub-sampled images, step 720. This step is typically performed according to the description in conjunction with step 620. The smallest spot dimension ranges from about 5 pixels to about 7 pixels.

The processing steps below, each operate upon the individual sub-sampled images separately. For example, steps 730–770 operate upon the original image, then operate upon a first sub-sampled image, then operate upon a second sub-sampled image, etc. In the step of selective post processing, step 770, data from each of the images operated upon are combined, as will be discussed.

In one embodiment, the step of performing defect specific filtering, step 730, begins by defining omni-directional Laplacian kernels. Of course, other convolution kernels for enhancing images may also be used depending upon the application. An exemplary convolution kernel is as follows:

| -1 | -1 | -1 | -1 |
| -1 | 1  | 1  | -1 |
| -1 | 1  | 1  | -1 |
| -1 | -1 | -1 | -1 |

As is well known to one skilled in the art frequency filtering of an image can be performed in the time domain by convolving the image with convolution kernels, or alternatively in the frequency domain by multiplying the fourier transform of the image with an image of the filter. In the present embodiment, convolutions in the time domain are preferred.

Next, similar to the process described in conjunction with the line Mura defect, the images are passed through a threshold to form thresholded images, step 740. From the thresholded image, blobs are identified and characterized, step 750. Mura defects are then determined in response to the blob, step 760, identified in step 750. This step preferably occurs in a similar manner as described in the line Mura defect case.

The method then includes a post processing step 770. One aspect of post processing is to separate individual pixel defects and line defects from area Mura defects. This step enables the user to focus attention upon area Mura defects and ignore other types of defects. The pixel and line defects may be removed by way of techniques known in the art, such as low-pass filtering.

Post Processing

Post processing enhances the user's ability to detect Mura defects, as disclosed in both the line and spot Mura detection sections, above.

Figure 9:
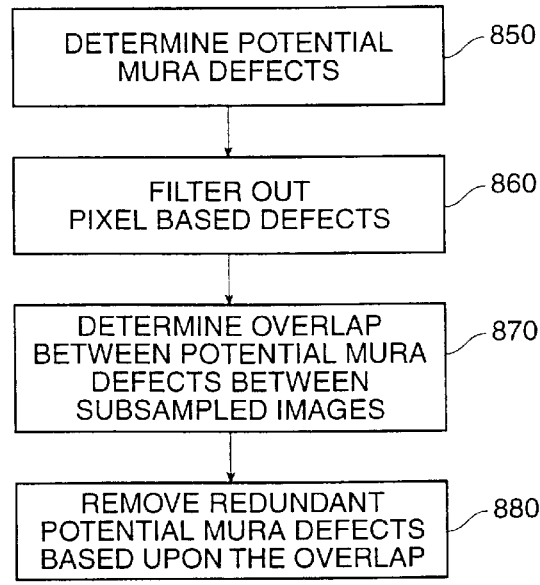
FIG. 9 illustrates a flow diagram of one embodiment of a post processing method.

FIG. 9 illustrates a flow diagram of one embodiment of a post processing method. FIG. 9 includes steps 790–820.

Initially, locations of what is herein described as "potential" Mura defects (or pixels having "anomalous" pixel values) are determined in each of the subsampled images, step 850. This step is typically performed by the method described in FIGS. 6 and 7.

Next, each of the thresholded subsampled images is filtered to remove pixel defects, step 860. In the preferred embodiment, the filter is a low pass filter. Alternatively, each of the thresholded subsampled images may be passed through an erosion filter. The effect of step 860 is to eliminate individual pixel defects from consideration as a Mura defect.

Next, based upon the "potential" Mura defects remaining from each of the subsampled images, it is determined whether there is overlap between "potential" Mura defects between subsampled images, or alternatively, if the "peaks" between subsampled images are within a certain distance. This can be performed by performing logical AND operations between each of the thresholded subsampled images, or determining the location of the "peaks".

Next, based upon the overlaps or the closeness between peaks, Mura defects found in different subsampled images are then attributed or consolidated to the same Mura defect, step 890.

Figure 10:
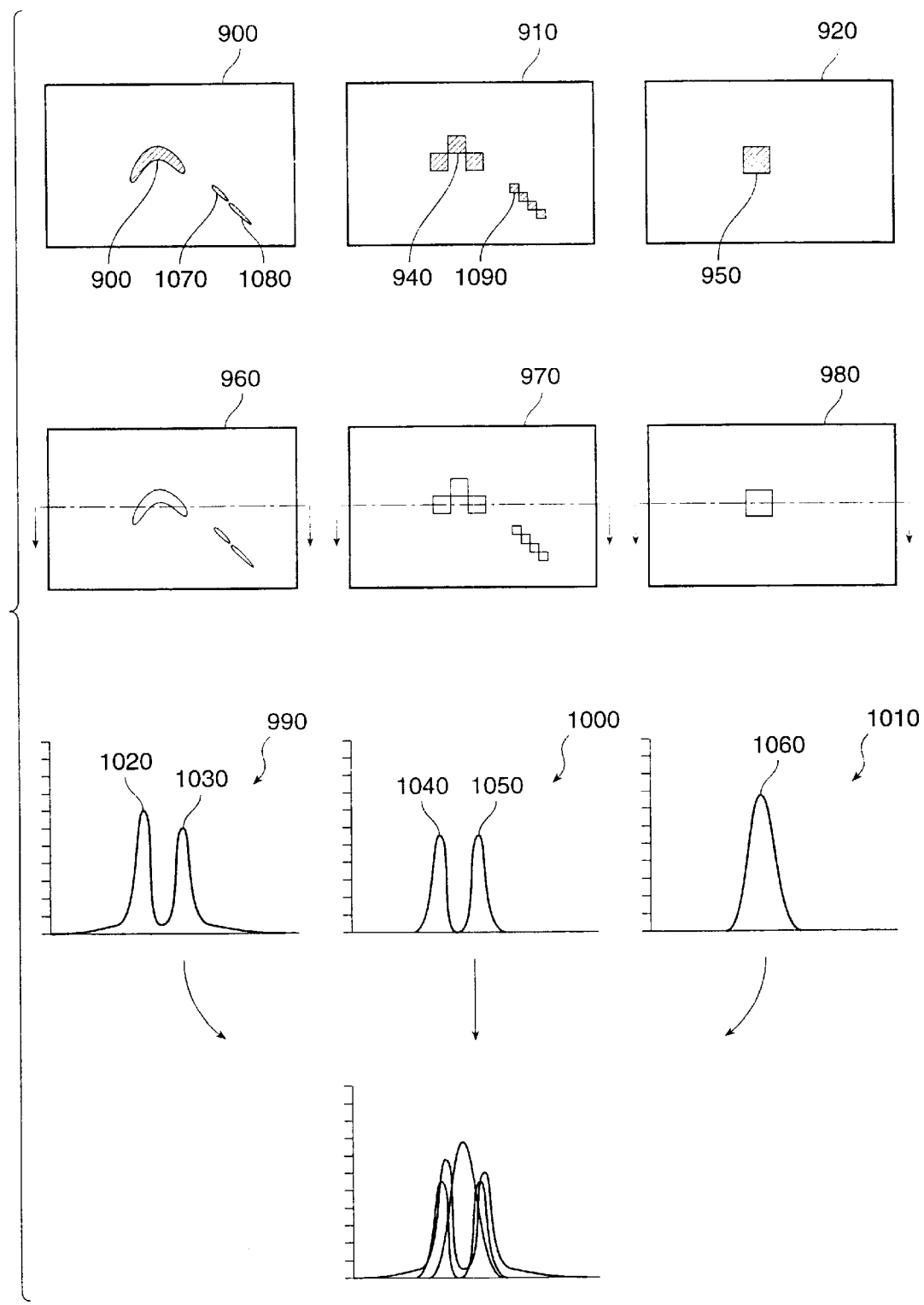
FIG. 10 illustrates an example of an embodiment of post processing on an image.

FIG. 10 illustrates an example of an embodiment of post processing on an image. FIG. 10 includes images 900, 910, and 920. Image 900 includes Mura defect 930, image 910 includes Mura defect 940, and image 920 includes Mura defect 950. FIG. 10 also includes filtered images 960, 970, and 980 and cross section 990, 1000, and 1010. Cross section 990 includes potential defects 1020 and 1030, cross section 1000 includes potential defects 1040 and 1050, and cross section 1010 includes potential defect 1060.

In the example in FIG. 10, image 900 illustrates an acquired image of a substrate. Using the subsampling techniques disclosed above, or other well-known techniques, images 910 and 920 are formed and represent subsampled images from image 900. Mura defect 930 in image 900 appears, subsampled, as Mura defect 940 in image 910 and appears as Mura defect 950 in image 920.

According to the preferred embodiment described above, each of the images 900–920 are filtered using edge detection techniques. In FIG. 10, filtered images 960–980 correspond to edges of objects within images 900–920.

In FIG. 9, cross sections 990–1010 correspond to cross-sections of intensity values versus position in each of the filtered images 960–980. Each cross sections 990–1010 are scaled to the same size. As illustrated, in cross section 990, two potential defects 1020 and 1030 are shown. Potential defects 1020 and 1030 correspond to the edges of Mura defect 870. In cross section 1000, two potential defects 1040 and 1050 are shown, corresponding to the edges of Mura defect 940. In cross section 1010, potential defect 1060 is shown, corresponding to Mura defect 950. Because image 920 is formed by subsampling image 900, Mura defect 950 appears as only one potential defect 950 in filtered image 980.

Continuing on with the process described in the Mura Detection methods described above, images 1070–1100 are detected blobs and images 1110–1130 are corresponding annular regions. The preferred embodiment of the present invention cross references potential defects 1020–1060 with respect to each other looking for overlapping potential defects between images. For example, it can be seen potential defect 1020 overlaps with potential defect 1040, and potential defect 1030 overlaps with potential defect 1050. Further potential defects 1060 overlaps with a potential defect 1050, and potential defect 1050 overlaps with potential defect 1030. Because the size of the Mura defect decreases with successive sub-sampling, any Mura defect present in the original image appears smaller in each successive subsample. Overlapping potential defects between successive subsampled images therefore indicates that the potential Mura defects map onto the same Mura defect. Thus, in the present example, it is recognized that potential defects 1020–1060 all report the same Mura defect 930 in the acquired image.

In the above example, overlap is illustrated along a row of the image. Alternatively, overlap along a column of the image is analyzed, or overlap in any direction (omnidirectional) is analyzed.

Subsampling and cross-referencing between subsampled images allows the user to connect line-type defects. FIG. 10 includes Mura defects 1070 and 1080 in image 900 and 1090 in image 910. Mura defects 1070 and 1080 are part of one line Mura defect. As illustrated in image 910, a result of subsampling image 900, only one defect, Mura defect 1090, appears. By cross-referencing image 910 and image 900, the user determines that Mura defects 1070 and 1080 are part of the same line Mura defect. In one embodiment, the user extrapolates along a Mura defect such as 1080 to detect discontinuities between portions of a line Mura defect. In this case, Mura defect 1070 is found and Mura defects 1070 and 1080 coalesce to one defect.

In an alternative embodiment of the present invention, the original image is filtered using different frequency cut-off filters to form the filtered images, as an alternative to subsampling of the image and then filtering the subsampled images. In a specific embodiment, larger kernel sizes are used for convolutions in order to achieve lower frequency cut-offs. By maintaining a record of which planes defects appear and disappear, the user is able to determine the sizes of the Mura defects, as well as the magnitude of the brightness non-uniformity for the Mura defect.

In the case of a line defect, the subsampled image where a line defect first disappears may indicate the width of a line because of the frequency cut-off. Thus, by subsampling the original image, the user can also determine and look for frequency specific defects, for example, from thin line defects (several pixels) to thicker line defects.

Conclusion

In the foregoing specification, the invention has been described with reference to specific exemplary embodiments thereof. Many changes or modifications are readily envisioned. For example, performing the filtering of images within the frequency domain, utilizing different convolution techniques, such as a Sobel operator, utilizing different convolution kernels and sizes, such as 7×7 kernel, using different threshold levels, such as five times the standard deviation, etc.

The presently claimed inventions may also be applied to other areas of technology that require optical inspection of a substrate for example, (non-exclusive) cathode ray tubes, semiconductor wafers, web inspection systems, medical imaging systems, and the like.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for detecting Mura defects on a substrate for a flat panel display, the method comprising the steps of:

a) acquiring an image of a first plurality of pixels in at least a portion of the substrate, the image including values of pixels from the first plurality of pixels;

b) enhancing differences in the values of pixels in the first plurality of pixels to form an enhanced image, the enhanced image including values of pixels from the first plurality of pixels;

c) thresholding the enhanced values of pixels from the first plurality of pixels to form a thresholded image, the thresholded image including thresholded values of pixels from the first plurality of pixels;

d) identifying a second plurality of pixels from the first plurality of pixels corresponding to at least one blob within the thresholded image;

e) identifying a third plurality of pixels from the first plurality of pixels corresponding to an annular region around at least one blob within the thresholded image;

f) comparing values of the second plurality of pixels to values of the third plurality of pixels;

g) determining a Mura defect in response to the comparison step.

2. The method of claim 1 wherein the enhancing step comprises the step of performing filters on the image to form the enhanced image.

3. The method of claim 1 wherein the enhancing step comprises performing an edge enhancement convolution.

4. The method of claim 2 wherein the filters are directional Laplacian kernels having directional orientation from 1 degree to 90 degrees.

5. The method of claim 2 wherein the filters are directional Laplacian kernels having directional orientation every 15 degrees beginning from 0 degree.

6. The method of claim 1 wherein the enhancing step comprises the steps of:

performing a plurality of filters individually on the image to form a plurality of filtered images; and combining the plurality of filtered images to form the enhanced image.

7. The method of claim 2 wherein the filters are defect specific filters.

8. The method of claim 1 further comprising the steps of:
after step g), subsampling the image to form a subsampled image; and
repeating steps b)–g) using the subsampled image.

9. The method of claim 1 wherein the step of thresholding further comprises the step of:
determining a mean pixel value for the enhancement values of the pixels in the first plurality of pixels;
determining a standard deviation pixel value for the enhanced values of the pixels in the first plurality of pixels;
determining a threshold pixel value for the enhanced values of the pixels in the first plurality of pixels in response to the mean pixel value and the standard deviation pixel value; and
applying the threshold pixel value to the enhanced values of the pixels in the first plurality of pixels to form the thresholded image.

10. The method of claim 1 wherein the step of thresholding further comprises the step of:
forming a histogram from the enhanced values of pixels in the first plurality of pixels;
determining a range of potentially defective pixel values in response to the histogram; and
thresholding pixels in the first plurality of pixels in response to the range of potentially defective pixel values to form the thresholded image.

11. The method of claim 1 further comprising the step of:
calculating an average pixel value for the second plurality of pixels;
wherein the step of identifying a third plurality of pixels comprises the step of:
dilating the second plurality of pixels corresponding to at least one blob to form a fourth plurality of pixels, the fourth plurality of pixels including the second plurality of pixels;
forming the annular region around the at least one blob by inhibiting the third plurality of pixels from the fourth plurality of pixels;
calculating an average background value by averaging pixel values for the third plurality of pixels; and
wherein the step of comparing comprises the step of:
comparing the average pixel value to the average background value.

12. The method of claim 11 wherein the step of calculating an average pixel value further comprises the step of calculating a standard deviation value for the second plurality of pixels.

13. The method of claim 11 wherein the step of calculating an average background value further comprises the step calculating a standard deviation for the third plurality of pixels.

14. The method of claim 13 wherein the step of comparing the average pixel value further comprises the step of comparing the standard deviation for the second plurality pixels to the standard deviation for the third plurality of pixels.

15. The method of claim 1 further comprising the step of characterizing specific attributes of the Mura defect.

16. The method of claim 1 further comprising the step of determining the cause of the Mura defect in response to the specific attributes of the Mura defect.

17. A method identifying a Mura defect on a substrate, comprising steps of:
acquiring an image comprising a blob defined onto a background image and storing the image as frame data, the blob being defined by first pixels and the background image being defined by second pixels;
thresholding the image to create a binary representation of the blob and the background image, the binary representation being defined by the first pixels at a first value and the second pixels at a second value;
calculating an average blob pixel value of the blob from pixels in the image corresponding to the blob;
dilating the binary representation of the blob by converting a portion of the second pixels at the second value adjacent to the first pixels at the first value to second pixels at the first value, the dilating step defining a dilated binary representation of the blob;
performing an XOR of the binary representation of the blob with the dilated binary representation of the blob to define an annular region comprising the second pixels at the first value;
calculating an average background image pixel value of the background image from pixels in the image corresponding to the annular region; and
comparing the average background image pixel value with the average blob pixel value to identify a Mura defect.

18. A computer system for detecting Mura defects on a substrate for a flat panel display, the substrate including a first plurality of pixels, the computer system comprising:
an image acquisition device for acquiring an image of at least a portion of the substrate, the portion including a second plurality of pixels, the image including values of pixels in the second plurality of pixels;
an enhancer for enhancing differences in the values of pixels in the second plurality of pixels to form an enhanced image, the enhanced image including enhanced values of pixels in the second plurality of pixels;
a thresholder for thresholding the enhanced values of pixels in the second plurality of pixels to form a thresholded image, the thresholded image including thresholded values of pixels in the second plurality of pixels;
an identifier for identifying a third plurality of pixels forming at least one blob within the portion of the substrate in response to the thresholded image;
a comparator for comparing values of the third plurality of pixels to values of pixels corresponding to an annular region around the at least one blob; and
a determiner coupled to the comparator for determining a Mura defect.

19. The computer system of claim 18 wherein the enhancer further comprises a convolver for performing an edge enhancement convolution.

20. The computer system of claim 18 wherein the comparator further comprises:
a first averager for calculating an average pixel value for the third plurality of pixels;
a dilator for dilating the at least one blob to form a fourth plurality of pixels, the fourth plurality of pixels including the third plurality of pixels;
a neighborhood determiner for forming the annular region around the at least one blob by inhibiting the third plurality of pixels from the fourth plurality of pixels;

a second averager for calculating an average background value by averaging pixel values for pixels within the annular region; and a comparator for comparing the average pixel value to the average background value.

21. A computer system for detecting Mura defects on a substrate for a flat panel display, the substrate including a first plurality of pixels, the computer system comprising:

a computer-readable memory including:

code that directs an image acquisition device to acquire an image of at least a portion of the substrate, the portion including a second plurality of pixels, the image including values of pixels in the second plurality of pixels;

code that enhances differences in the values of pixels in the second plurality of pixels to form an enhanced image, the enhanced image including enhanced values of pixels in the second plurality of pixels;

code that thresholds the enhanced values of pixels in the second plurality of pixels to form a thresholded image, the thresholded image including thresholded values of pixels in the second plurality of pixels;

code that identifies a third plurality of pixels forming at least one blob within the portion of the substrate in response to the thresholded image;

code that compares values of the third plurality of pixels to values of pixels corresponding to an annular region around the at least one blob; and code that determines a Mura defect in response to the comparison step.

22. The computer system of claim 21 wherein the computer-readable memory also includes code that performs an edge enhancement convolution.

23. The computer system of claim 21 wherein the computer-readable memory also includes:

code that calculates an average pixel value for the third plurality of pixels;

code that dilates the at least one blob to form a fourth plurality of pixels, the fourth plurality of pixels including the third plurality of pixels;

code that forms the annular region around the at least one blob by inhibiting the third plurality of pixels from the fourth plurality of pixels;

code that calculates an average background value by averaging pixel values for pixels within the annular region; and code that compares the average pixel value to the average background value.

24. A method for detecting Mura defects in a substrate for a liquid crystal display, the substrate having a plurality of pixels, the method comprising the steps of:

acquiring an image of the substrate;

creating a plurality of subsampled images from the image;

determining locations of potential Mura defects in the substrate in response to locations of Mura defects in each of the plurality of subsampled images; and determining Mura defects in the substrate in response to the locations of potential Mura defects in each of the plurality of subsampled images.

25. The method of claim 24 further comprising the steps of:

applying a filter to each of the plurality of subsampled images to form a plurality of filtered images;

thresholding each of the plurality of filtered images to form a plurality of thresholded images; and wherein the step of determining locations further comprises determining locations of potential Mura defects in the substrate in response to locations of pixels in each of the plurality of thresholded images exceeding a threshold value;

wherein the step of detecting Mura defects further comprises detecting Mura defects in the substrate in response to the locations of the potentially defective pixels in the substrate.

26. The method of claim 24 further comprising the steps of:

inhibiting offset components from pixels in the image; and inhibiting gain components from the pixels in the image.

27. The method of claim 25 wherein the filter comprises an edge-detect filter.

28. The method of claim 25 wherein the filter is a convolution.

29. The method of claim 25 wherein the filter is a Laplacian filter.

30. The method of claim 25 wherein the step of thresholding each of the plurality of filtered images comprises:

determining a plurality of mean pixel values, one mean pixel value for each of the plurality of filtered images;

determining a plurality of standard deviations, one standard deviation for each of the plurality of filtered images;

determining a plurality of threshold pixel values, one threshold pixel value for each of the plurality of images in response to the mean pixel value and the standard deviation for the image; and applying the plurality of threshold pixel values to each respective image in the plurality of images to form the plurality of thresholded images.

31. The method of claim 24 wherein the step of determining locations of potentially defective pixels comprises the steps of:

determining locations of a first plurality of potentially defective pixels in the substrate in response to locations of pixels in a first subsampled image having anomalous values;

determining locations of a second plurality of potentially defective pixels in the substrate in response to locations of pixels in a second subsampled image having anomalous values; and wherein the step of determining Mura defects comprises the steps of:

comparing locations of the first plurality of potentially defective pixels in the substrate to locations of the second plurality of potentially defective pixels in the substrate, to form a third plurality of potentially defective pixels in the substrate; and determining Mura defects in the substrate in response to the third plurality of potentially defective pixels in the substrate.

32. A method for detecting Mura defects in a substrate for a liquid crystal display, the substrate having a plurality of pixels, the method comprising the steps of:

acquiring an image of the substrate;

applying a plurality of filters individually to the image to form a plurality of filtered images, the plurality of filters having different frequency cut-offs;

thresholding each of the plurality of filtered images to form a plurality of thresholded images; and determining locations of potentially defective pixels in the substrate in response to locations of pixels in each of the plurality of thresholded images exceeding a threshold value; and detecting Mura defects in the substrate in response to the locations of the potentially defective pixels in the substrate.

33. The method of claim 32 further comprising the steps of:

inhibiting offset components from pixels in the image; and inhibiting gain components from the pixels in the image.

34. The method of claim 32 wherein the plurality of filters are convolutions.

35. The method of claim 32 wherein the plurality of filters are Laplacian filters.

36. The method of claim 32 wherein the step of thresholding each of the plurality of filtered images comprises:

determining a plurality of mean pixel values, one mean pixel value for each of the plurality of filtered images;

determining a plurality of standard deviations, one standard deviation for each of the plurality of filtered images;

determining a plurality of threshold pixel values, one threshold pixel value for each of the plurality of images in response to the mean pixel value and the standard deviation for the image; and applying the plurality of threshold pixel values to each respective image in the plurality of images to form the plurality of thresholded images.

37. The method of claim 32 wherein the step of determining locations of potentially defective pixels comprises the steps of:

determining locations of a first plurality of potentially defective pixels in the substrate in response to locations of pixels in a first filtered image having anomalous values;

determining locations of a second plurality of potentially defective pixels in the substrate in response to locations of pixels in a second filtered image having anomalous values; and wherein the step of determining Mura defects comprises the steps of:

comparing locations of the first plurality of potentially defective pixels in the substrate to locations of the second plurality of potentially defective pixels in the substrate, to form a third plurality of potentially defective pixels in the substrate; and determining Mura defects in the substrate in response to the third plurality of potentially defective pixels in the substrate.

38. A computer system for detecting Mura defects in a substrate for a liquid crystal display, the substrate having a plurality of pixels, the computer system comprising:

an image acquiring device for acquiring an image of the substrate;

a sampler for creating a plurality of subsampled images from the image;

a pixel determiner for determining locations of potentially defective pixels in the substrate in response to locations of pixels in each of the plurality of subsampled images having anomalous values; and a Mura determiner for determining Mura defects in the substrate in response to the locations of potentially defective pixels determined in the substrate.

39. The computer system of claim 38 further comprising:

a filter device for applying a filter to each of the plurality of subsampled images to form a plurality of filtered images;

a thresholding device for thresholding each of the plurality of filtered images to form a plurality of thresholded images;

wherein the pixel determiner comprises a potential pixel determiner for determining locations of potentially defective pixels in the substrate in response to locations of pixels in each of the plurality of thresholded images exceeding a threshold value; and the Mura determiner for determining Mura defects in the substrate in response to the locations of the potentially defective pixels in the substrate.

40. A computer system including a computer program for detecting Mura defects in a substrate for a liquid crystal display, the substrate having a plurality of pixels, the computer system comprising:

a computer-readable memory including:

code that directs an image acquisition device to acquire an image of the substrate;

code that creates a plurality of subsampled images from the image;

code that determines locations of potentially defective pixels in the substrate in response to locations of pixels in each of the plurality of subsampled images having anomalous values; and code that determines Mura defects in the substrate in response to the locations of potentially defective pixels determined in the substrate.

41. A liquid crystal display substrate inspected according to the method described in claim 24.

42. A computer system manufactured with a liquid crystal display substrate inspected according to the method described in claim 24.

43. A display device including a liquid crystal display substrate inspected according to the method described in claim 24.

44. A liquid crystal display substrate inspected according to the method described in claim 1.

45. A display device including a liquid crystal display substrate inspected according to the method described in claim 1.

* * * * *